Dec. 1, 1936.   C. M. JEPSEN   2,062,908
POULTRY HOUSE CLEANER
Filed March 23, 1936

Carl M. Jepsen, INVENTOR
BY Victor J. Evans & Co.
ATTORNEY

Patented Dec. 1, 1936

2,062,908

UNITED STATES PATENT OFFICE 2,062,908

POULTRY HOUSE CLEANER

Carl M. Jepsen, Bellingham, Wash.

Application March 23, 1936, Serial No. 70,475

3 Claims. (Cl. 37—124)

This invention relates to poultry house cleaners and has for an object to provide a motor driven apparatus including a reciprocating scoop which latter will readily pick up the gummy litter under roosts and the like.

A further object is to provide means for cushioning the shock of the reciprocating scraper so that breakage will be prevented.

A further object is to provide spring means for yieldably holding the scoop firmly on the ground or floor so that the same will be thoroughly scraped, yet will not be damaged.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
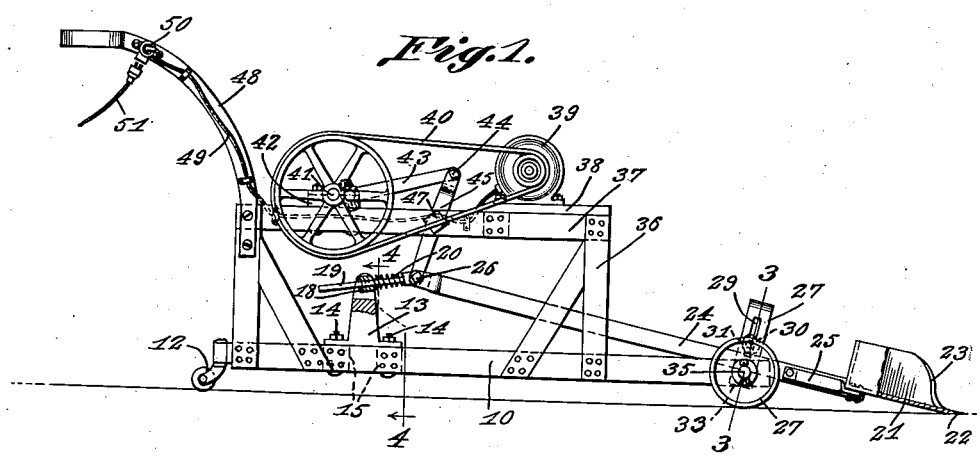
Figure 1 is a side elevation of a poultry house cleaner constructed in accordance with the invention.

Referring now to the drawing in which like characters of reference designate similar parts in the various views, 10 designates longitudinal sills which are connected at the rear ends by a cross sill 11 to which is secured a caster 12.

Figures 3, 4:
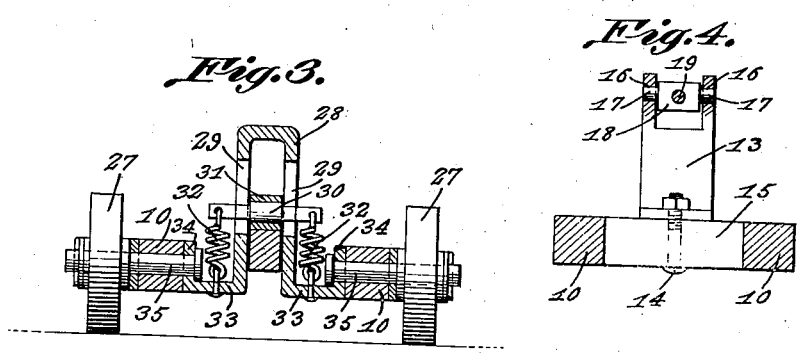
Figure 3 is a detail cross sectional view taken on the line 3—3 of Figure 1.
Figure 4 is a detail cross sectional view taken on the line 4—4 of Figure 1.

As shown in Figure 4 an upright bracket 13 is bolted, as shown at 14 to a pair of cross beams 15 secured to the longitudinal sills near the rear ends thereof. The bracket is provided with bearing openings 16 which receive gudgeons 17 of a combined guide and abutment block 18. A rod 19 is slidably fitted in an opening in the block and a spring 20 is mounted on the rod and is confined under tension against the block to cushion the retrograde stroke of the scoop.

The scoop 21 is formed of sheet metal and the leading edge 22 of the bottom of the scoop projects beyond the leading edges 23 of the side walls of the scoop. A beam 24 is secured to the scoop and is braced in position by diagonal strip braces 25 which are secured to the beams and to the scoop. The rear end of the beam is pivotally secured to the end of the rod 19 by means of a pivot pin 26, shown best in Figure 1.

The beam 24 is yieldably supported upon the front ends of the longitudinal sills 10 between the front supporting wheels 27 of the apparatus by means of an inverted U-shaped guide 28, the legs of which are provided with slots 29 to receive a pin 30 which is equipped with a roller 31 which engages the top face of the beam. A pair of suspension springs 32 are terminally secured to the ends of the pin and to out-turned feet 33 of the guide 28. These springs exert a downward pull upon the beam and thus hold the scoop snugly in contact with the floor boards from which the litter is to be removed.

The guide 28 is provided with upturned ends 34 which are provided with openings to receive the axles 35 of the front wheels 27.

Figure 2:
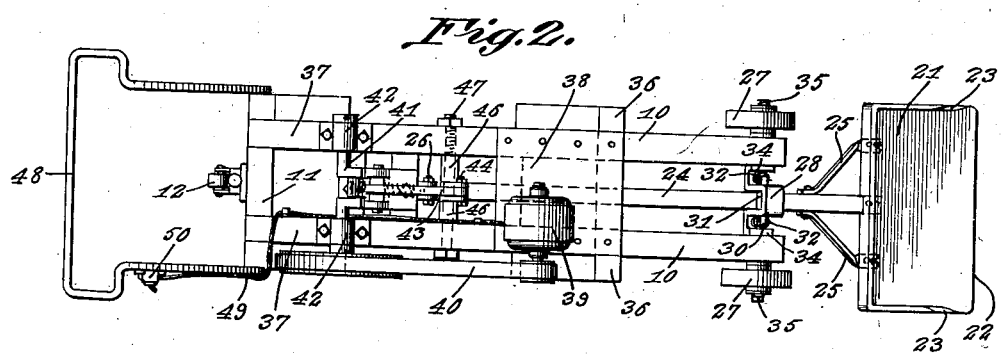
Figure 2 is a plan view of the parts shown in Figure 1.

By referring to Figures 1 and 2 it will be seen that uprights 36 rise from the longitudinal sills 10 and are connected at the upper ends by longitudinal bars 37 at the front ends of which a shelf 38 is mounted to support a frictional horse power motor 39. The motor is connected by a belt drive 40 to one end of a crank shaft 41 which is mounted in bearings 42 disposed near the rear ends of the bars 37. A connecting rod 43 is connected at one end to the crank and at the free end is pivotally connected as shown at 44 to a rock lever 45 which is provided intermediate its ends with a sleeve 46 to receive a pivot bolt 47 that connects the bars 37 between the motor and the crank shaft.

The lower end of the lever is connected to the pivot pin 26 of the rod 19 previously described. A handle 48 is secured to the rear uprights 36 and permits of the apparatus being maneuvered during the operation of cleaning under roosts and the like. The conductor cable 49 of the motor is trained along the handle and is secured to a combined switch and socket 50 placed within convenient reach of the operator on the handle. The current supply cable 51 may be plugged into the socket and should be of sufficient length to reach all portions of the building to be cleaned.

In operation when the motor is started the scoop will be reciprocated back and forth by means of the connecting rod 43 and rock lever 45. By virtue of the spring 20 on the rod 19 the retrograde stroke of the scoop will be cushioned, the rod 19 sliding freely through the plug 18 which latter swivels to accommodate reciprocatory movement of the beam 24 and oscillating movement of the rock lever 45.

From the above description it is thought that the construction and operation of the invention will be fully understood without further explanation.

What is claimed is:

1. A poultry house cleaner comprising a wheeled frame, a pivot thereon, a rod slidably mounted in the pivot, a spring on the rod, a beam connected to the rod, a crank and pitman device on the frame for reciprocating the beam longitudinally of the frame, said spring cushioning the stroke of the beam, a scoop on the free end of the beam, a guide on the frame directing reciprocatory movement of the beam, and springs on the frame tending to hold the beam downward for holding the scoop against the ground.

2. A poultry house cleaner comprising longitudinal sills, supporting wheels at the front ends thereof, a caster at the rear ends thereof, a frame supported on said sills, a scoop in advance of the sills, a beam connected at the front end to the scoop, a rock lever on the frame pivoted intermediate its ends to the frame, a pivot connecting the rear end of the beam to the lower end of the rock lever, a crank and pitman device connected to the upper end of the rock lever for reciprocating the beam and scoop, and resilient means connected to said pivot and cushioning the stroke of the beam.

3. A poultry house cleaner comprising longitudinal sills, supporting wheels at the front ends thereof, a frame supported on said sills, a scoop in advance of the sills, a beam connected at the front end to the scoop, there being an upstanding loop formed in the axle of said front supporting wheels and slidably receiving said beam, there being slots in the sides of the loop, a pin engaged through said slots and through the beam, springs connecting the ends of the pin with said front axle and tending constantly to hold the scoop on the ground, a rock lever on the frame, a pivot connecting the rear end of the beam to the rock lever, and a crank and pitman device connected to the rock lever for reciprocating the beam and the scoop.

CARL M. JEPSEN.